2,850,488
NOVEL HYDROCARBON POLYMERS

Warren Nesmith Baxter and Ivan Maxwell Robinson, Wilmington, and Louis Herman Rombach, Claymont, Del., assignors to E. I. du Pont de Nemours and Company, Wilmington, Del., a corporation of Delaware No Drawing. Application July 15, 1955
Serial No. 522,394

17 Claims. (Cl. 260—88.1)

This invention relates to novel hydrocarbon polymers and in particular to a novel class of polymers derived from cyclic hydrocarbons having a 5-membered ring, having an olefinic linkage conjugated with an aromatic double bond, e. g. indene, acenaphthylene, etc. The invention also relates to novel interpolymers derived from the said cyclic compounds and one or more other monomers, such as alpha olefinic hydrocarbons. The invention also relates to a process for the preparation of such polymers and interpolymers.

Recently it has become known that alpha olefins can be converted directly to partially crystalline polymers. Not only have such polymerizations been carried out with ethylene but also with higher non-cyclic olefinic hydrocarbons. It has not been known, however, that olefins having internal double bonds can similarly be polymerized to solid polymers having a substantial or relatively high crystallinity.

Indene has been polymerized heretofore by various methods. For example, it has long been known that indene can be polymerized by means of sunlight or suitable catalysts among which may be included oxygen, peroxides, sulfuric acid, hydrogen fluoride, metal halides, etc. Resinous polymers having melting points well above 200° C. have thus been obtained, but in general, these polymers have been of relatively low molecular weight and have not been useful in applications for which high molecular weight commercial polymers, such as polyethylene or polystyrene, are well suited.

An object of this invention is to prepare, from hydrocarbons having the above defined cyclic structure, polymers and interpolymers which are of high molecular weight and which are partially crystalline. A further object is to prepare such polymers from indene and acenaphthylene, respectively. A further object of the invention is to prepare solid interpolymers having relatively high crystallinity from ethylene and indene. Another object of the invention is to prepare relatively tough fibers and films from said polymers and interpolymers. Other objects of the invention will become apparent hereinafter.

The objects of the invention are accomplished by the polymerization of the cyclic hydrocarbon (e. g. indene, acenaphthylene) in the presence of a catalyst system obtained by admixing a reducible compound of an element of the class consisting of titanium, zirconium, vanadium, chromium, and molybdenum with a reducing component having a hydrocarbon radical or hydrogen directly attached to a metal atom. Among the reducing agents which are most effective are those having a hydrocarbon radical directly attached to aluminum, e. g. lithium aluminum tetraalkyl.

The formation of solid polymers in accordance with this invention can be carried out under extremely mild conditions. Atmospheric pressure may be employed. It is, of course, possible to employ moderately high pressures, the optimum range of pressure being about 1 to 100 atmospheres. Room temperature is entirely suitable, but any temperature within the range of about −80° to +200° C. may be used. The polymerization is generally carried out in the presence of an inert hydrocarbon solvent, such as cyclohexane, benzene, toluene, or n-heptane. In polymerizing the monomers, in accordance with the present invention, the reaction takes place most satisfactorily in the absence of any substantial amount of moisture and in the absence of other sources of hydroxyl groups, since hydroxylated compounds like water or alcohols tend to destroy the activity of the catalyst system. The catalyst components may be admixed in the presence of the monomers. It is sometimes preferable, however, to add the reducing agent to the reducible component rather than to employ the reverse order of addition in order to obtain catalysts of maximum activity.

The mol ratio of reducing component to reducible component in the catalyst system can be varied over a wide range, but it is generally desirable to employ enough reducing component to lower the valence state of the transition element in the reducible component to two.

In the preparation of interpolymers according to the process of the invention, the ratio of polymeric components depends upon the ratio of monomers in the reaction mixture. The monomers may be dissolved in the inert reaction medium, if desired, prior to bringing the monomers into contact with the catalyst or with the reducible component thereof, or the monomers may be added alternately, portionwise, until all of the monomeric charge has been introduced.

The invention is further illustrated by means of the following examples.

Example I

Into a stainless steel shaker tube having a capacity of 330 cc. was placed 15 grams (0.13 mol) indene, 1 gram (0.026 mol) LiAlH$_4$ and 100 cc. dry toluene. The tube was alternately flushed with nitrogen and evacuated three times to provide a 100% nitrogen atmosphere. The tube was then heated to 130° for 45 minutes with shaking, after which it was cooled to 75° C., whereupon 42 cc. of a solution containing 1.9 grams (0.01 mol) VCl$_4$ in dry toluene was injected. The temperature was maintained at 75° C. for an additional 45 minutes after which the mixture was allowed to cool to room temperature. The contents of the tube were then discharged and mixed with acetone (a few hundred cc.). The solid phase was recovered by filtration and was suspended in 250 cc. of toluene. This mixture was heated under refluxing conditions after which it was filtered while still hot to remove insoluble inorganic residue. The filtrate was poured into acetone yielding 4 grams of polymer (dry weight). This material could be compression molded at 270° C. to yield a clear brittle film. The molecular weight as determined cryoscopically was 2050. The polymer had an inherent viscosity of 0.15 in benzene. The crystallinity of the unannealed film as determined by X-ray analysis was approximately 10%.

Example II

To a cyclohexane solution of isopropyl lithium containing 0.015 mol of isopropyl lithium was added dropwise, with shaking, 0.01 mol TiCl$_4$. This operation was carried out in the absence of oxygen or moisture. A black solution was thus obtained. After 10 minutes, 20 grams (0.17 mol) indene was added to this mixture. The reaction vessel was shaken vigorously, sealed, and allowed to stand for 36 hours with occasional shaking. The contents were then poured into acetone, filtered, washed with acetone and dried. The white polymer thus obtained weighed 2 grams. It could be compression molded at 270° C. into a clear brittle film. The film had a melting point (block method) of 258° to 269° C. The unannealed film had a crystallinity of approximately 10% as determined by X-ray analysis.

*Example III*

Into a stainless steel shaker tube having a capacity of 330 cc. was charged 15 grams (0.13 mol) indene, 1 gram (0.026 mol) LiAlH$_4$ admixed with 100 cc. dry toluene. The tube was flushed with nitrogen as described in Example I. After this, 15 grams (0.54 mol) ethylene was introduced. The tube was heated to a maximum temperature of 130° C. for 30 minutes then cooled to 75° C. Into the tube was then injected 42 cc. of a toluene solution containing 1.9 grams (0.01 mol) of VCl$_4$. The temperature was held at 75° C. for an additional 60 minutes then allowed to drop to room temperature. The resulting mixture was poured into acetone, stirred in a Waring Blendor and filtered. The resulting cake was washed in a Waring Blendor with acetone-HCl mixture until the cake was colorless. This was followed by washing with acetone-water to remove acid. Finally, the cake was washed with acetone and dried. The dried white polymer thus obtained weighted 31 grams. A clear film was obtained by compression molding the polymer at 180° C. The polymer showed no flow in a standard Melt Indexer at 190° C. The presence of indene in the interpolymer was shown by ultra-violet analysis. Soxhlet extraction with chloroform for 14 hours resulted in the separation of a soluble fraction which comprised 17.5% of the sample and which had a much higher indene content than the insoluble residue.

*Example IV*

Into a stainless steel shaker tube having a capacity of 330 cc. was charged 15 grams (0.13 mol) indene, 1 gram (0.026 mol) LiAlH$_4$, 2.6 grams (0.01 mol) MoBr$_2$ and 100 cc. dry toluene. The tube was flushed with nitrogen as described in Example I and 5 grams (0.18 mol) ethylene was added. The tube was heated to 130° C. for 30 minutes then cooled to 75° C. whereupon a 50 cc. solution of 1.9 grams (0.01 mol) of TiCl$_4$ in dry toluene was injected. After 10 minutes, an additional 10 grams (0.36 mol) of ethylene was introduced. The temperature was maintained at 75° C. for 60 minutes after which the mixture was allowed to cool to room temperature. The product was worked up in the manner described in Example III. A clear film of the resulting interpolymer was obtained by compression molding at 170° C. The polymer had a melt index of 0.30 at 190° C. The presence of indene in the interpolymer was shown by ultraviolet analysis.

*Example V*

A 1 liter resin kettle, equipped with stirrer, thermometer, dropping funnel, condenser and gas inlet tube, was flushed thoroughly with dry N$_2$. To the kettle was added, while maintaining a dry N$_2$ atmosphere, 200 ml. of pure dry cyclohexane, 0.013 mol of LiAl(isopropylethyl)$_4$ and 0.026 mol of TiCl$_4$. The mixture was heated with stirring to 80° C. for 20 min., then cooled to room temperature. The N$_2$ was stopped and ethylene was bubbled into the solution in slight excess, so that a positive pressure of ethylene was maintained in the system. In 35 minutes, the temperature rose 13.5° C. The ethylene was shut off and once more an inert atmosphere of N$_2$ was maintained. During the next 25 minutes 0.56 mol of indene was added slowly. After standing for 15 hours, the N$_2$ was stopped and ethylene was bubbled into the solution in slight excess, for 90 minutes, during which time the temperature rose 3° C.

The reaction mixture was poured into acetone and filtered; the solid was washed in a Waring Blendor with acetone, filtered and dried in a vacuum oven at 50° C. The weight of the polymer was 28.5 grams.

The material had a melt index of 76 at 300° C. A compression molded film was somewhat brittle. The polymer contains 40–50% indene and the crystallinity as determined by X-ray diffraction pattern on the film was 17%.

After solution of the product in xylene followed by reprecipitation of the polymer with acetone, the film crystallinity was found to be 50%. The indene content still was 10 to 20%, and the brittleness of a compression molded film decreased.

Extraction of the initial polymeric product with absolute methyl alcohol provided a material which was very similar to the original polymer sample since only a trace of soluble fraction was removed.

*Example VI*

A resin kettle was assembled and flushed according to the description given in the preceding example. To it was added while maintaining a dry N$_2$ atmosphere 200 cc. of pure dry cyclohexane, 0.0228 mol LiAl(heptyl)$_4$ and 0.0342 mol of TiCl$_4$. The mixture was heated with stirring to 80° C. for 20 minutes, then cooled to room temperature. By means of the dropping funnel, 0.86 mol of indene was added in 25 minutes. The nitrogen was shut off and propylene was bubbled into the solution at slight excess to maintain a positive pressure of propylene on the system. After 10 minutes, the propylene addition was stopped and a N$_2$ atmosphere was maintained for 15.5 hours. The N$_2$ was again shut off and propylene was bubbled into the solution at slight excess for 3 hours, during which time the temperature rose 2° C.

The reaction mixture was poured into acetone and filtered. The cake was washed in a Waring Blendor with n-BuOH followed by acetone to remove the alcohol. The vacuum-dried polymer weighed 8.2 grams and had a melt index of 70 at 300° C. The material could be compression molded into a clear flexible film. The crystallinity as determined by X-ray diffraction pattern was 6% and the indene content was approximately 50%.

After the sample was extracted with xylene to remove the catalyst residue, the polymer was reprecipitated with acetone. This material now had an indene content of 10 to 20% and the crystallinity of a compression molded film was 21%.

*Example VII*

A 10 gallon polyethylene bag equipped with an inlet tube was assembled in such a way that an inert atmosphere of N$_2$ could be provided by alternately evacuating and filling the bag with pure dry N$_2$ five times. In the bag was placed lithium ribbon, a vessel containing pentane and 0.04 mol isopropyl chloride, a reaction vessel, a funnel for dispensing indene into the reaction vessel and a funnel for dispensing hexadecane into the reaction vessel, and a vessel containing aluminum tribromide. The bag was sealed, by folding and clamping, when filled with dry nitrogen, and all manipulations were performed while keeping the reactants and apparatus within the bag. A solution of 0.04 mol isopropyl lithium was prepared by using an excess of lithium metal for reaction with the isopropyl chloride. The supervalent liquid was transferred to the reaction flask containing 0.01 mol AlBr$_3$. The following reaction was carried out in such a dry bag. The ensuing reaction was quite vigorous. After termination of the reaction, the flask was closed and stored with occasional shaking for 24 hours outside of the dry bag. After returning to the dry bag 0.01 mol of TiCl$_4$ was added with shaking. Ten minutes later a mixture containing 0.07 mol of 1-hexadecene and 0.17 mol of indene was added. The flask was again sealed and allowed to stand for 11 days after which time it was opened. To destroy active catalyst, an excess of isopropyl alcohol and 2-B alcohol was added. The mixture was then poured into acetone and filtered. The cake was refluxed in toluene and the insoluble catalyst residue was removed by filtration while still hot. The polymer was recovered by pouring the filtrate into acetone. The product was freed of xylene by continued washing with acetone. The cake was dried in a vacuum oven at 50° C. and thereupon weighed 7.8 grams. Infra red analysis indicated the presence of both monomer components in the polymer. X-ray diffraction patterns indicated a low crystallinity with the amorphous halo lying intermediate in position between the halos in polyindene and poly-1-hexadecene.

Example VIII

In a dry nitrogen atmosphere 0.0228 mol LiAl(heptyl)$_4$ was admixed with 0.0342 mol TiCl$_4$ in 250 ml. dry cyclohexane, with stirring. The mixture was heated to 80° C. for 20 minutes, and cooled. Through a dropping funnel was added 15 grams acenaphthylene in 100 ml. decahydronaphthylene. The temperature rose 5° C. After the mixture had remained overnight, ethylene was introduced to maintain a slight positive pressure. This was continued for 2.5 hours, after which the mixture was poured into an excess of acetone (ca. 500 ml.) and filtered. The cake was washed with acetone in a Waring Blendor. The final polymer weighed 25.8 grams. A specimen was converted to a film by compression molding, and the density was found to be 0.95. The polymer would not flow at 300° sufficiently for determination of melt index. Infra-red analysis showed that both monomeric components were present.

Example IX

Into a 1 liter flask, equipped with a stirrer, dropping funnel, gas inlet and condenser, in the presence of dry nitrogen, was introduced 250 ml. pure dry cyclohexane, 0.0228 mol LiAl(heptyl)$_4$, 0.0342 mol TiCl$_4$. The mixture was heated to 80° C., then cooled to room temperature. A solution of 20 grams acenaphthylene in 100 ml. decahydronaphthylene was added, through a dropping funnel, during a period of 15 minutes. Temperature rose 4° C. The system was kept under a positive pressure of dry nitrogen for 3.5 days, after which the reaction mixture was poured into cold dry isopropanol (ca. 500 ml.). The mixture was filtered, and the cake was washed with fresh isopropanol and dried in a vacuum oven at 50° C., to produce 16 grams of polymer. A specimen of this product was melt drawn into a fiber. Another specimen was compression molded into a film. Both were brittle. The polymer had about 10% crystallinity as measured by X-ray diffraction.

Example X

Using the dry bag technique described in example VII, 0.01 mol AlCl$_3$ in 100 ml. dry cyclohexane was admixed with 0.04 mol n-butyl lithium. After the vigor of the reaction had subsided, the flask was sealed and stored with occasional shaking for one day. To this was added with agitation 0.01 mol TiCl$_4$. After 15 minutes, 19.6 grams n-hexadecene-1 and 10.0 grams acenaphthalene were added. The flask was closed and stored with occasional shaking for 4 days. Thereupon the mixture was poured into acetone and filtered. The cake was washed with acetone in a Waring Blendor until white. The polymeric product, after drying at 50° C. in a vacuum oven weighed 15 grams. Infra red analysis showed that both monomeric components were present in the product.

It is to be understood that the foregoing examples are illustrative only and that numerous embodiments of the invention will occur to those who are skilled in the art. The process of the invention can be performed either batchwise or continuously, and any suitable method for recovery of the polymeric product from the reaction mixture can be employed. If desired, destruction of the catalyst can be achieved by heating with an alkanol. After removal of inorganic components by filtration, soluble polymers can be isolated by evaporating the solvent medium.

The products thus obtained can be fabricated into articles, films, and fibers or can be used in casting applications by techniques developed for polymers, such as polyethylene and polystyrene. The polymers can be blended with other thermoplastic polymers. Fillers and foaming agents can be added to serve particular applications of the products of this invention.

We claim:
1. The process which comprises polymerizing a compound of the class consisting of indene and acenaphthylene in the presence of a catalyst formed by admixing a halide of an element of the class consisting of titanium, vanadium and molybdenum, with a reducing compound having at least one radical of the class consisting of hydrogen and hydrocarbon radicals attached directly to a metal of the class consisting of lithium and aluminum, in an inert liquid hydrocarbon medium.
2. Process of claim 1 wherein the said element is titanium, and the reducing compound is introduced in sufficient quantity to reduce the valence of the titanium at least in part to two.
3. Process of claim 1 wherein the monomers subjected to the action of the said catalyst comprise both ethylene and indene.
4. Process of claim 1 wherein the only monomer subjected to the action of the said catalyst is indene.
5. Process of claim 1 wherein the only monomer subjected to the action of the said catalyst is acenaphthylene.
6. Process of claim 1 wherein the monomers subjected to the action of the said catalyst comprise acenaphthylene and an alpha olefinic aliphatic hydrocarbon.
7. A partially crystalline ethylene-indene interpolymer, obtained by the process of claim 3.
8. A partially crystalline polyindene obtained by the process of claim 4.
9. A partially crystalline polyacenaphthylene obtained by the process of claim 5.
10. A partially crystalline acenaphthylene - n - hexadecene-1 interpolymer obtained by the process of claim 6.
11. Process of claim 1 wherein said reducing compound is LiAlH$_4$.
12. Process of claim 1 wherein said reducing compound is an alkyl lithium.
13. Process of claim 1 wherein said reducing component is a lithium aluminum tetraalkyl.
14. Composition of claim 7, in film form.
15. Composition of claim 8, in film form.
16. Composition of claim 9, in film form.
17. Composition of claim 10, in film form.

References Cited in the file of this patent

UNITED STATES PATENTS

| | | |
|---|---|---|
| 2,373,714 | Soday | Apr. 17, 1945 |
| 2,445,181 | Miller et al. | July 13, 1948 |
| 2,721,189 | Anderson et al. | Oct. 18, 1955 |

FOREIGN PATENTS

| | | |
|---|---|---|
| 533,362 | Belgium | May 16, 1955 |